Patented Apr. 20, 1954

2,676,094

UNITED STATES PATENT OFFICE 2,676,094

PARA-ALKYLPHENOLS AS RICH MIXTURE ADDITIVES

George H. Denison, Jr., San Rafael, Joseph C. Firey, Richmond, and Edward J. McLaughlin, El Cerrito, Calif., assignors to California Research Corporation, San Francisco, Calif., a corporation of Delaware No Drawing. Application December 19, 1950, Serial No. 201,702

7 Claims. (Cl. 44—52)

This invention relates to improved spark ignition engine fuels; more particularly, to spark ignition engine fuels boiling in the gasoline boiling range and having improved anti-knock characteristics under rich-mixture conditions, and to a method for preparing such fuels.

In order to obtain increased power output from spark ignition engines (e. g., aircraft engines) before knocking occurs, it has become the practice in recent years to supercharge the engine. However, supercharging as a means of increasing the power output before knocking is limited, in that a given fuel can tolerate just so much supercharging, beyond which excessive knocking occurs. By employing rich fuel-air mixtures, that is, a ratio of fuel to air greater than that required for complete combustion, a greater amount of supercharging can be tolerated with a given fuel than if a lean mixture is employed. This expedient also has its limitations, however, in that when a certain richness is reached, the engine misfires and the power output drops off.

Agents have been proposed as additives for spark ignition engine fuels to increase still further the power output available from a fuel under supercharging and rich-mixture conditions. Tetraethyl lead has been used extensively for such a purpose. Other agents which have been proposed are the metal carbonyls, e. g., iron pentacarbonyl.

Despite the advantages of tetraethyl lead, its use is disadvantageous owing to several factors, such as its toxicity and its tendency to deposit lead compounds in carburetors, manifolds, valves, cylinders or exhaust pipes.

A further method of trying to solve the problem of knocking has been the manufacture of special base fuels by cracking, by isomerization of straight chain to branch chain hydrocarbons, and by alkylation of isoparaffins with olefins. Judicious blending of stocks so prepared with one another and/or with straight run distillates has also contributed to upgrading base fuels. Even by combining the advantages of tetraethyl lead, superior base stocks, supercharging, and rich mixtures, it is difficult to meet certain aviation engine power requirements such as are necessary in take-off of heavily loaded aircraft. Also, the above-noted disadvantages inherent in the use of tetraethyl lead remain.

Fuels of the gasoline type have been rated as to anti-knock quality generally by the CFR–ASTM–D357–43T method and the CFR–ASTM–D614–43T method (hereinafter called the F–2 method and the F–3 method, respectively). These methods have rated fuels dependably for lean mixture use, i. e., use under normal or cruising conditions; but they are not dependable for rating fuels for use in supercharged engines using rich mixtures, as in aircraft take-off and climbing. Under these latter conditions, many fuels that have been rated as 100-octane or better by the F–2 and F–3 methods have proved to be inferior fuels under conditions of extreme power requirements where the engine is supercharged and a rich fuel-air mixture is used. Fuels are rated under rich mixture conditions by the CFR–AFD–F4–443 method (hereinafter called the F–4 method). This method is described in a report by the Coordinating Research Council dated April 20, 1943, and entitled, "CFR Super-Charge Method of Test for Knock Characteristics of Aviation Fuels." This method, the description of which has been widely circulated and which is widely used, rates a fuel under conditions of supercharging and rich fuel-air mixtures, and it correlates well with full-scale ratings of fuels, as in aircraft take-off and climbing. The engine employed is a single cylinder, liquid cooled, gasoline spark ignition engine; the cylinder is the same as that used in the F–2 method of rating fuels. Manifold fuel injection is employed; the engine is equipped for supercharge; the compression ratio is 7:1; and the engine is operated at 1800 R. P. M., 375° F. jacket temperature, 225° F. air temperature, and 45° F. spark advance BTC. Further details as to design and operation can be obtained from the above-mentioned report.

Ratings by the F–4 method are given herein in terms of octane number up to 100 octane, and above 100 octane, they are given as performance numbers or as equivalents of isooctane plus $n$ milliliters of tetraethyl lead per gallon of fuel, $n$ being a positive number usually of the order of 1 to 10. For convenience hereinafter, F–4 ratings will be referred to in performance numbers and as so many octane units (e. g., 98 octane units), where the fuel rated is not more than the equivalent of pure isooctane (which has an octane number of 100) and as S plus $n$ (e. g., S plus 1.0), where S stands for isooctane and $n$ for the number of milliliters of tetraethyl lead required to be added to isooctane to produce a fuel having the same F–4 value as the fuel rated. (The number of milliliters of tetraethyl lead, $n$, means $n$ milliliters of the compound $Pb(C_2H_5)_4$.)

The performance number is used to designate the relative knock-limited power output of fuels having octane numbers above 100 when rated according to the F–4 procedure. A fuel having an octane number of 100 when rated by the F-4 procedure has a performance number of 100. A fuel which has a performance number of 150 will have a knock-limited power output 1.5 times that of a fuel having a performance number of 100 (e. g., pure isooctane).

The problem of producing a fuel having an F-2 method octane number of 100 is quite different than the problem of producing a fuel having a rich-mixture performance number greater than 100. Simply because a compound, when added to a base fuel, will raise the F-2 method octane number of that fuel does not mean that the same compound will raise the rich mixture performance number of that same fuel. As noted hereinbelow, some of the compounds which increase the F-2 method octane number actually depress the rich-mixture performance number of the base fuel.

It is an object of the present invention to provide a fuel composition containing an additive to increase the rich-mixture performance number of the composition, said additive being the sole agent present to effect an increase in rich-mixture performance number.

It is a particular object of the present invention to provide a method of obtaining, and to provide aviation fuels having superior rich-mixture ratings without entire reliance upon selection of base fuel and the use of large amounts of tetraethyl lead.

It is a further particular object of the invention to provide unleaded aviation fuels having high anti-knock, and especially high F-4 ratings.

It is a further object of the present invention to provide a gasoline type of fuel for aircraft engines which provides improved anti-knock characteristics under conditions of supercharging and of rich fuel-air mixtures.

These and other objects of the invention will be apparent from the following description and the appended claims.

In accordance with the invention, a para-alkylphenolic compound or mixture of para-alkylphenolic compounds is incorporated in spark ignition engine fuels employed under rich-mixture conditions in amount sufficient substantially to increase the anti-knock value of the fuel, the phenolic compound or compounds being selected from the group consisting of p-cresol, p-ethylphenol, p-isopropylphenol, p-secondary butylphenol, and p-tertiary butylphenol.

The base fuel of the invention may be hydrocarbon fuels substantially gum free, boiling in the gasoline boiling range, i. e., having an ASTM D-86 distillation with an initial boiling point of about 100° F. and a final boiling point of about 400° F. Preferably, however, a petroleum base fuel is employed which is substantially gum free; that is, substantially free of gum-forming constituents such as olefinic hydrocarbons, e. g., monoolefins and diolefins, etc., commonly believed to be the primary cause of gum formation; a straight run petroleum distillate; a catalytically recracked gasoline distillate, catalytically recracked to convert the olefinic constituents of the distillate; an alkylate (e. g., sulfuric acid or HF isoparaffin-olefin alkylate); an aromatic fuel (e. g., cumene, toluene, m- and p-xylene, etc); a catalytically reformed gasoline; a natural gasoline; hydrogenated polymers (e. g., polymers of butene which, upon hydrogenation, have characteristics of isooctane, etc.); isopentane or butane; a specific hydrocarbon (e. g., 2,2,3,-trimethyl butane, etc.); or a blend of two or more of the above and other types of fuels. Most advantageously, a base fuel is employed boiling within the range above prescribed, which is derived from petroleum (such as straight run distillate-sulfuric acid alkylate-isopentane blend), is substantially stable to oxidation (i. e., does not oxidize readily upon standing; does not readily form gums or polymerization products or lose color upon standing), and has an F-2 octane number not less than 100. Another somewhat equally suitable hydrocarbon base is a blend of straight run gasoline, aromatic hydrocarbons (e. g., p- and m-xylene), alkylate, and isopentane or butane. Other specific blends of stocks which may be advantageously used to form the hydrocarbon portion of this invention include blends of straight run gasoline, retreated catalytically cracked hydrocarbons, hydrogenated polymers, natural gasoline, catalytically reformed gasoline, and isopentane or butane. Such base fuels can be prepared by blending of suitable stocks as exemplified in the specific examples below and/or by the addition of an amount of tetraethyl lead sufficient to bring the octane number of the base fuel to at least 100.

As stated, tetraethyl lead may be added to the hydrocarbon portion of the fuel of this invention in minor amounts sufficient to raise the F-2 octane number of the hydrocarbons above at least 100. It is generally preferred not to add more than about 6 cc. of tetraethyl lead. More specifically, it is preferred not to add more than about 4.6 cc. per gallon of fuel and, in many instances, 3-4 cc. per gallon of fuel or less may be sufficient.

The phrase "substantially gum-free" as used herein and in the appended claims is intended to mean that the raw hydrocarbon portion of the composition of the invention shall not contain gum in amounts greater than about 6 milligrams per 100 milliliters as measured by ASTM method D381-49 (existent gum in gasoline) or by ASTM method D873-49 (oxidation stability of aviation gasoline). As commonly practiced in the industry, gum inhibitors are not added to raw hydrocarbons boiling in the gasoline boiling range containing gum not greater than about 6 milligrams per 100 milliliters. This is primarily based upon the relative ineffectiveness of known gum inhibitors to inhibit such small amounts of gum and that such small amounts of gum do not generally cause difficulties in engine operation.

It is generally desirable to add small amounts of tetraethyl lead stabilizers when it is a component of this invention to prevent deposition of the lead and, even more important, to insure effective utilization of the tetraethyl lead in the combustion chamber of the engine.

The class of phenolic compounds, as stated, consists of several p-alkylphenols; i. e., p-cresol, p-ethylphenol, p-isopropylphenol, p-secondary butylphenol, and p-tertiary butylphenol. Of these, p-cresol and p-tertiary butylphenol are preferred. Mixtures of two or more of these phenols may be used, e .g., p-cresol and p-tertiary butylphenol.

The o-, m-, and p-isomers of the alkylphenolic compounds all have relatively the same order of effectiveness in increasing the octane ratings when tested at lean fuel-air mixture conditions. For example, when 1% of o-cresol was added to a base fuel having an octane number of 70.7, the octane number was raised to 72.5. Similarly, when 1% of the m- and p-cresol was added to the same base fuel, the octane numbers were raised to 71.9 and 73.2 respectively. However, under conditions of rich fuel-air mixtures, the p-isomer is particularly outstanding in increasing the antiknock value of the base fuel.

The following Table I shows the effectiveness of the p-cresol and the ineffectiveness of the o- and m-cresols in improving the F-4 rating of a spark ignition engine fuel. The F-4 rating of the base fuel was S+0.7 (rich mixture performance number of 120), to which was added 1% (by weight) of the cresol isomer.

TABLE I

| Cresol Isomer (1% added to Base Fuel) | Rich Ratings | | Rich Ratings Improvement (Performance Nos.) |
|---|---|---|---|
| | S + ml. TEL | (Performance Nos.) | |
| o-cresol | S + 0.5 | 116 | −4 |
| m-cresol | S + 0.6 | 118 | −2 |
| p-cresol | S + 1.6 | 134 | +14 |

The above data show that the o- and m-cresols did not enhance the F-4 ratings of the base fuel; the F-4 ratings of the base fuels containing the o- and the m-cresols were actually less than the unblended base fuel.

Thus, it is seen that the addition of 1% of o- and m-cresol to separate portions of the same base fuel having an F-2 octane number of 70.7, increased the F-2 octane numbers by 1.8 and 1.2 octane numbers, respectively. However, when the same cresol isomers were blended in a base fuel having a rich mixture performance number of 120, the rich mixture F-4 test procedure showed that the o- and m-isomers depressed the rich mixture performance numbers; the performance numbers were depressed by 4 and 2 numbers, respectively.

In addition to the para-alkylphenolics, other compounds may be added to the base fuels; and other agents such as cloud point depressants, ketones, alcohols, esters, aliphatic amines, and other stabilizing agents may also be used.

Other agents which improve the octane numbers of the fuel may additionally be used; such agents may be used as tetraethyl lead, aromatic amines (e. g., amino-phenolics, phenylene diamines and phenyl amine), iron carbonyl and the like.

The para-alkylphenolics may be used in amounts sufficient to improve the anti-knock value (the octane number and rich-mixture performance number of the spark ignition engine fuel when used at conditions of rich fuel-air mixture), with amounts ranging from about 0.15% to 10% based on weight of the finished fuel, about 0.25% to 3% being preferred.

Blending of the addition agents and the base fuels is simple, comprising merely mixing the para-alkylphenol and the base fuel together with such heat and/or agitation as is necessary.

The fuels of this invention may be unleaded (no tetraethyl lead) or leaded. The unleaded fuels offer the advantage of improved anti-knock ratings without the deleterious effects of tetraethyl lead, and the leaded fuels are especially useful as premium grade rich-mixture fuels. Thus, a fuel having a clear octane rating (F-2 method) of 80 may be taken as the base fuel. Tetraethyl lead may be added to the base fuel in amounts sufficient to raise the F-2 octane number to at least 100; then a para-alkylphenol (e. g., p-cresol) or mixture of para-alkylphenols of the invention may be added in quantity (e. g., 1% of p-cresol) sufficient to produce a finished fuel having an F-4 rating of S+1.5 or more (rich mixture performance number of 133 or more).

The method of this invention obviates the disadvantages inherent in the use of large quantities of lead (for example, the toxicity of the lead and the deposition of lead compounds in carburetors, manifolds, valves, cylinders, or exhaust pipes).

The method of the invention is also more economical in that it is relatively expensive to use large quantities of lead in increasing the octane numbers of a low octane fuel to 100 or more.

The following example will serve further to illustrate the practice and advantages of this invention.

Example

Para-alkylphenolic compounds of the invention were blended to a concentration of 1% by volume in an 100 octane aviation fuel composed as follows:

35 volume percent isoparaffinic alkylate
7 volume percent isopentane
58 volume percent Midway California straight run gasoline (composed essentially of naphthene and paraffin hydrocarbons and containing less than 5 volume percent aromatic hydrocarbons)

and containing 4 milliliters of tetraethyl lead (TEL) per gallon. The F-4 rich mixture rating of the base fuel was S+0.7 (performance number of 120) and the F-4 rich mixture ratings of these blends are tabulated below:

TABLE II

| Additive | F-4 Rich Ratings | Improvement in F-4 Rich Rating Due to Additive |
|---|---|---|
| p-cresol | S + 1.6 ml. TEL—134 performance number. | 0.9 ml. TEL—14 performance number. |
| p-ethyl phenol | S + 1.3 ml. TEL—131 performance number. | 0.6 ml. TEL—11 performance number. |
| p-t-butyl phenol | do | Do. |

This application is a continuation-in-part of application Serial No. 792,348, filed December 17, 1947, for "Phenolics as Rich Mixture Additives," and now abandoned.

Having thus described and presented an example of the composition of this invention, it will be understood that this invention embraces such other variations and modifications as come within the spirit and scope thereof.

We claim:

1. A spark ignition engine fuel comprising a base fuel of hydrocarbons boiling in the gasoline boiling range substantially free of gum-forming constituents as measured by ASTM D381-49 and ASTM D873-49 methods below about 6 mg. of gum per 100 ml., not greater than about 6 cc. per gallon of tetraethyl lead, and having an F-2 octane number above about 100 blended with a small amount, sufficient substantially to improve the rich-mixture performance of said fuel, of para-alkylphenols having an alkyl group containing 1 to 4 carbon atoms, inclusive.

2. A spark ignition engine fuel of improved rich-mixture characteristics comprising a base fuel of petroleum hydrocarbons boiling in the gasoline boiling range substantially free of gum-forming constitutents as measured by ASTM D381-49 and ASTM D873-49 methods below about 6 mg. of uninhibited gum per 100 ml., up to about 4.6 cc. per gallon of tetraethyl lead blended with 0.25 to 3.0% by weight of para-alkylphenols having an alkyl group containing 1 to 4 carbon atoms, inclusive.

3. A spark ignition engine fuel of improved rich-mixture rating comprising a predominant proportion of substantially gum-free hydrocarbon base fuel as measured by ASTM D381-49 and ASTM D873-49 methods below about 6 mg. of gum per 100 ml. boiling in the gasoline boiling range consisting of a blend of at least two members of the group consisting of straight run gasoline, catalytically recracked gasoline, alkylate boiling in the gasoline boiling range, catalytically reformed gasoline, natural gasoline, hydrogenated polymers boiling in the gasoline boiling range, isopentane, aromatic hydrocarbons boiling in the gasoline boiling range, butane, and 2,2,3-trimethylbutane, not greater than about 4.6 cc. per gallon of tetraethyl lead and having an F-2 octane number of at least about 100 blended with about 0.25 to about 3.0 per cent by weight of para-alkylphenols having an alkyl group containing 1 to 4 carbon atoms, inclusive.

4. The fuel of claim 3, wherein said phenol is p-cresol.

5. The fuel of claim 3, wherein said phenol is p-tertiary-butylphenol.

6. The fuel of claim 3, wherein said phenol is p-ethylphenol.

7. The fuel of claim 3, wherein said phenol is a mixture of p-cresol and p-tertiary-butylphenol.

References Cited in the file of this patent

UNITED STATES PATENTS

| Number | Name | Date |
|---|---|---|
| 2,023,385 | Story | Dec. 3, 1935 |
| 2,275,175 | Cloud | Mar. 3, 1942 |
| 2,361,337 | Walters | Oct. 24, 1944 |
| 2,434,650 | Herbst | Jan. 20, 1948 |